United States Patent [19]

Chang et al.

[11] 4,417,022

[45] Nov. 22, 1983

[54] COATING COMPOSITIONS BASED ON POLYOL-CONTAINING FILM FORMING COMPONENTS AND ORGANIC ALCOHOLIC REACTIVE DILUENTS

[75] Inventors: Wen-Hsuan Chang; James B. O'Dwyer, both of Gibsonia; John R. Peffer, Pittsburgh, all of Pa.

[73] Assignee: PPG Industries, Inc., Pittsburgh, Pa.

[21] Appl. No.: 364,825

[22] Filed: Apr. 2, 1982

Related U.S. Application Data

[62] Division of Ser. No. 101,397, Dec. 7, 1979, Pat. No. 4,343,925.

[51] Int. Cl.$^3$ .............................................. C08L 61/22
[52] U.S. Cl. .................................... 524/598; 525/123; 525/128; 525/154; 525/327.1; 525/327.3; 525/327.4; 525/327.5; 525/327.6; 525/304; 525/343; 525/379; 525/380; 525/384; 525/385; 525/386

[58] Field of Search ............... 525/304, 123, 128, 154, 525/343, 384, 385, 386, 379, 380, 327.1, 327.4, 327.2, 327.5, 327.6; 524/598

[56] References Cited

U.S. PATENT DOCUMENTS 2,870,117  1/1959  Vogel et al. ......................... 525/519
4,022,726  5/1977  Zabrocki et al. .................... 525/519

*Primary Examiner*—J. Ziegler
*Attorney, Agent, or Firm*—H. Lawrence Jones; Charles R. Wilson

[57] ABSTRACT

Coating compositions capable of liquid application to substrates consist essentially of a curable film forming polyol-containing component and an organic reactive diluent. The reactive diluent is an organic compound containing a primary or secondary hydroxyl group and further characterized by having a retained solids value of greater than about 80 percent, a hydroxyl equivalent weight of from about 180 to about 800, and a liquid viscosity of less than about 10 poise at 60° C. The coating compositions can be formulated to contain little or no volatile organic solvent and/or water.

17 Claims, No Drawings

COATING COMPOSITIONS BASED ON POLYOL-CONTAINING FILM FORMING COMPONENTS AND ORGANIC ALCOHOLIC REACTIVE DILUENTS

This is a division of application Ser. No. 101,397, filed Dec. 7, 1979 U.S. Pat. No. 4,343,925, issued Aug. 10, 1982.

BACKGROUND OF THE INVENTION

The subject invention relates to coating compositions. More particularly, the invention relates to coating compositions which can be formulated to contain substantially no organic solvent of a high volatility.

Many different coating compositions possessing various physical characteristics are known. The coating compositions normally contain a curable film forming resin and a solvent or dispersant. Examples of curable resins include vinyl resins, acrylic resins, epoxy resins, urethane resins, etc. All the polymeric resins have inherent characteristics which make them more suitable than other resins for a particular end use. Various additives or modifiers are also known which can be added to the coating compositions in minor amounts so as to modify the characteristics of the film former. The solvent or dispersant is present for the purpose of thinning the composition to facilitate its application to a substrate and to improve its flow properties. The solvent and dispersant can generally be defined as a chemical which thins a coating but is volatile and therefore is lost to the atmosphere when the composition is applied to a substrate. Suitable solvents and dispersants have included both organic solvents and water.

In recent years, there have been expressed concerns over the presence of solvents, especially organic solvents, in coating compositions. The organic solvents are mainly derived from petroleum products, and thus are expensive and in short supply. Additionally, a potential pollution problem exists with the organic solvents unless elaborate disposal or recovery procedures are used. A still further concern with the use of solvents in the coating compositions is with respect to the need to supply energy to the coated substrate to drive off the solvent. This energy is needed regardless of whether the solvent is an organic solvent or water.

Water-based coating compositions do not have an inherent potential pollution problem. As a result, much activity has been directed towards the formulation of water-based coatings in recent years. However, one of the problems associated with a water-based coating is the fact the polymeric film former normally has present various hydrophilic groups which are water sensitive and can react with water. As a result, films formed from the water-based compositions do not have all the physical characteristics oftentimes desired and needed. Additionally, energy is still needed to drive off the water, special corrosion-resistant equipment must be used and air conditioning systems are usually needed to control humidity.

Ideally, a coating composition would have little or no solvent present with the attendant problems, yet would be fluid enough for conventional fluid application to substrates. Technologies such as described in U.S. Pat. No. 4,022,726, Zabrocki et al, May 10, 1977, wherein a reactive diluent is used, attempt to meet the above objectives. The reactive diluent is said to be capable of thinning the coating composition yet reactive with the film forming resin so as to become a part of the film upon cure. Unfortunately, many of the available "reactive diluents" evaporate from the thin film prior to reacting and thus do not fulfill their objective.

There has now been found a class of materials which can be added to coating compositions. When used in aqueous compositions, the materials act as coalescing aids. Moreover, the addition of the materials at low levels desirably modifies the characteristics of the film former while addition of the materials at a higher level modifies the film and acts as a reactive diluent. That is, the reactive diluent desirably modifies the film former resin and at the same time thins the coating composition without a substantial pollution problem or energy demand. A consequence of using the reactive diluent is a substantially reduced need for the use of conventional organic solvents.

As used herein, all ratios and percents are by weight unless otherwise indicated.

SUMMARY OF THE INVENTION

The subject invention relates to coating compositions capable of fluid application to a substrate. The vehicle portion of the composition consists essentially of (a) from about 60 percent to about 97 percent of a polyol-containing curable film forming component and (b) from about 3 percent to about 40 percent of an organic reactive diluent capable of chemically combining with the curable film forming component. The reactive diluents are ethers having less than 5 ether groups, amides, esters, urethanes, ureas, sulfur-containing compounds, and mixtures thereof and have one primary or secondary hydroxyl group and are further characterized by having a retained solids value of greater than about 80 percent, a hydroxyl equivalent weight of from about 180 to about 800, and a liquid viscosity of less than about 10 poise at 60° C.

DETAILED DESCRIPTION OF THE INVENTION

The vehicle portion of the coating compositions described herein contains curable film forming components and reactive diluents. As more fully explained below, the curable film forming components cure by the inclusion of crosslinking agents in the compositions or are self-curing by means of internal crosslinking groups on the film former resin's molecule. Each of these components, as well as modes of application, are described in the following paragraphs.

The curable film forming component is a polyol-containing resin capable of curing with external crosslinking agents or capable of curing by means of internal cross-linking. Several different classes of polyolcontaining resins are known. Classes of materials which can be used herein are hydrocarbon polyols, ester polyols, ether polyols, polyester polyols, polyether polyols, polyamide polyols, polyurethane polyols, polyurea polyols, cyclic nitrogen-containing polyols, acrylic polyols and mixtures thereof. The hydrocarbon polyols, polyether polyols and polyester polyols are preferred with the polyester polyols being most preferred. The curable film forming component can be a single resin or a mixture of resins. A common characteristic of the organic polyol resins is the fact they must have a hydroxyl equivalent weight of from about 40 to about 500, preferably from about 40 to about 400, most preferably from about 60 to about 300 for high solids compositions, and a hydroxyl functionality of at least about 2.0. (Hydroxyl functionality is defined to be

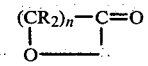

Classes of the polyols are described in the following paragraphs.

Hydrocarbon polyols include trimethylolpropane; trimethylolethane; glycerol; 1, 2, 4-butane triol; 1, 2, 6-hexane triol; erythritol; sorbitol; mannitol; and diglycerol. The triols are preferred.

Ester polyols are obtained by reacting a polyol with one mole or less of a monocarboxylic acid. The polyols have a hydroxyl functionality of at least 3.0, examples of which are described immediately above. Suitable monocarboxylic acids include benzoic acid, hexanoic acid, octanoic acid, decanoic acid. Lauric acid, myristic acid, stearic acid, oleic acid, linoleic acid and linolenic acid can be used, but are less desirable.

Useful ether polyols are made by reacting a suitable polyol as described above with a monoepoxide, e.g. butyl glycidyl ether, octyl glycidyl ether, allyl glycidyl ether, phenyl glycidyl ether, 1,2-butylene oxide, styrene oxide, glycidyl acrylate, and glycidyl methacrylate.

Polyester polyols are generally formed by the esterification of polyols with polycarboxylic acids or acid anhydrides. The lower molecular weight, i.e. below about 1000, preferably below about 600, polyester polyols are preferred for high solids compositions. The polyols conventionally employed in making the polyester polyols include alkylene glycols, such as ethylene glycol, propylene glycol, butylene glycol and neopentyl glycol, and other glycols such as hydrogenated bisphenol A, cyclohexanedimethanol, caprolactone-diol reaction products, hydroxyalkylated bisphenols, polyether glycols, e.g., poly(oxytetramethylene) glycol, and similar type compounds. Other diols of various types and polyols of higher functionality can also be used. Such higher polyols include trimethylolpropane, trimethylolethane, pentaerythritol and higher molecular weight polyols, such as obtained by the reaction product of ethylene oxide and trimethylolpropane and various hydrolyzed epoxide resins.

Suitable carboxylic acids used in the reaction with the above-described polyols include phthalic, isophthalic, terephthalic, tetrahydrophthalic, hexahydrophthalic, adipic, azelaic, sebacic, maleic, glutaric, chlorendic, tetrachlorophthalic, maleic, fumaric, itaconic, malonic, suberic, 2-methylsuccinic, 3,3-dimethylglutaric, 2,2-dimethylsuccinic acid and trimellitic acid. Anhydrides of these acids where they exist can also be employed and are encompassed by the term "carboxylic acid". Monocarboxylic acid such as benzoic acid and hexanoic acid can also be used, provided the average functionality of the polyol is above about 2.0. Saturated acids (including those aromatic acids where the only unsaturation is in the aromatic ring) are preferred.

It is also possible to produce polyester polyols containing one or two alkylene oxide groups per hydroxy group and preferably no more than three alkylene oxide groups per ester group. Such resins preferably have a molecular weight of 1,000 or less. The alkylene oxide-containing polyester polyol can be produced by substituting an alkylene oxide containing polyol for all or part of the polyol component used to produce the polyester polyol. Useful alkylene oxide containing polyols include diethylene glycol, triethylene glycol, dipropylene glycol, tetraethylene glycol, 2,2-bis(hydroxyethoxyphenyl) propane and 2,2-bis(beta-hydroxypropoxyphenyl)-propane. These polyester polyols can also be produced by oxalkylating any one of the above-described polyester polyols.

Polyester polyols can also be made from the reaction of a lactone with a polyol. The lactones, commercially available, are represented by the structure:

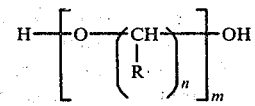

where n is from 2 to 9 and the R's are hydrogen, alkyl, cycloalkyl, alkoxy and single ring aromatic hydrocarbon radicals. Preferred lactones are the epsilon-caprolactones where n equals 5. Polyols, such as the above described diols and triols are used in the reaction with the lactone.

Examples of polyester polyols are polyalkylene ether polyols which include those having the following structural formula:

$$H-\left[O-\left(CH-\atop R\right)_n\right]_m-OH$$

where the substituent R is hydrogen or lower alkyl containing from 1 to 5 carbon atoms including mixed substituents, n is from 2 to 6 and m is from 2 to 20. Included are poly(oxytetramethylene) glycols, poly(oxyethylene) glycols, poly(oxy-1,2-propylene) glycols and the reaction products of ethylene glycol with a mixture of 1,2-propylene oxide and ethylene oxide.

Also useful are polyether polyols formed from oxyalkylation of various polyols, for example, glycols such as ethylene glycol, 1,6-hexanediol, and bisphenol A, or other higher glycols, such as trimethylolpropane and pentaerythritol. Polyols of higher functionality which can be utilized as indicated can be made, for instance, by oxyalkylation of compounds such as sorbitol or sucrose. Once commonly utilized oxyalkylation method is by reacting a polyol with an alkylene oxide, for example, ethylene or propylene oxide, in the presence of an acidic or basic catalyst.

Polyamide polyol resins useful in the instant invention are produced using conventional techniques. In general, the resins are produced from any of the above-described polyacids or lactones and diols, triols and higher alcohols and small amounts of diamines or amino alcohols. Suitable diamines and amino alcohols include hexamethylenediamine, ethylenediamine, monoethanolamine, phenylenediamine, toluenediamine and diethanolamine. For low-organic solvent-containing compositions, the molecular weight of the polyamide polyols is generally less than about 800.

Besides the above-mentioned polymeric polyols, polyurethane polyols can also be used. These polyols can be prepared by reacting any of the above-mentioned polyols with a minor amount of polyisocyanate (OH/NCO equivalent ratio greater than 1:1, preferably greater than about 2:1) so that free hydroxyl groups are present in the product. Mixtures of both high molecular weight and low molecular weight polyols may be used. Among the low molecular weight polyols are diols and triols such as aliphatic polyols including alkylene polyols containing from 2 to 18 carbon atoms. Examples include ethylene glycol, 1,4-butanediol, 1,6-hexanediol and cycloaliphatic polyols such as 1,2-hexanediol and cyclohexanedimethanol. Examples of triols include trimethylolpropane and trimethylolethane. Useful high molecular weight polyols are those described above. Also useful are polyols containing ether linkages such as diethylene glycol and triethylene glycol. Also, acid-containing polyols such as dimethylolpropionic acid and amino alkyl alcohols such as ethanol amine and diethanol amine can be used.

The organic isocyanate which is used to prepare the polyurethane polyols can be an aliphatic or an aromatic isocyanate or a mixture of the two. The aliphatic isocyanates are preferred when exterior durability is a requisite. Also, diisocyanates are preferred although higher polyisocyanates and monoisocyanates can be used in place of or in combination with diisocyanates. Examples of suitable higher polyisocyanates are 1,2,4-benzene triisocyanate and polymethylene polyphenyl isocyanate. Examples of suitable monoisocyanates are butyl isocyanate, cyclohexyl isocyanate, phenyl isocyanate and tolyl isocyanate. Examples of suitable aromatic diisocyanates are 4,4'-diphenylmethane diisocyanate, 1,3-phenylene diisocyanate, 1,4-phenylene diisocyanate and toluene diisocyanate. Examples of suitable aliphatic diisocyanates are straight chain aliphatic diisocyanates such as 1,4-tetramethylene diisocyanate and 1,6-hexamethylene diisocyanate. Also, cycloaliphatic diisocyanates can be employed. Examples include 1,4-cyclohexyl diisocyanate, isophorone diisocyanate, alpha, alpha'-xylylene diisocyanate and 4,4'-methylene-bis-(cyclohexyl isocyanate).

The polyurea polyol resins are generally produced by reacting any of the above-described polyisocyanates with either an amino alcohol, such as monoethanol amine, or an amino alcohol and a diol. Preferably, for high solids compositions, the molecular weights of the polyurea polyols are less than about 800 where no alkylene oxide groups are present and preferably lower than 1,000 where one or two alkylene oxide groups per hydroxy group is present.

Suitable cyclic nitrogen containing polyols include such compounds as tris(hydroxyethyl)isocyanurate (THEIC), N,N'-bis(hydroxyethyl)dimethyl hydantoin (BHDH), 1,4-bis[4,4-bis(hydroxymethyl)-1,3-oxazol-2-ene-2-yl] butane, hydroxyalkylated THEIC, hydroxyalkylated BHDH, bis(hydroxyethyl)ethylene urea, and 4,4-bis (hydroxymethyl)-1,3-oxazolidin-2-one.

All of the above described curable polyols require a crosslinking agent to cure to a durable film. The crosslinking agent used with the above-described polyols is selected from the group consisting of aminoplast resins, phenoplast resins, blocked or unblocked isocyanate resins and mixtures thereof. The aminoplast resins are preferred.

Aminoplast resins are based on the addition products of formaldehyde, with an amino- or amido-group carrying substance, e.g., urea, ethylene diurea, ethylene urea, melamine and benzoguanamine. Condensation products obtained from the reaction of alcohols and formaldehyde with melamine, urea or benzoguanamine are preferred herein. Useful alcohols used to make etherified products are monohydric alcohols such as methanol, ethanol, propanol, butanol, benzyl alcohol and butoxyethanol. An etherified melamineformaldehyde resin is the preferred aminoplast resin.

Several different isocyanate crosslinking agents can be used. Examples include the aliphatic compounds such as trimethylene, tetramethylene, pentamethylene, hexamethylene, 1,2-propylene, 1,2-butylene, 2,3-butylene, 1,3-butylene, ethylidene and butylidene diisocyanates; the cycloalkylene compounds such as 1,3-cyclopentane, 1,4-cyclohexane and 1,2-cyclohexane diisocyanate; the aromatic compounds, such as m-phenylene, p-phenylene, 4,4'-diphenyl, 1,5-naphthalene and 1,4-naphthalene diisocyanate; the aliphatic-aromatic compounds such as 4,4'-diphenylene methane, 2,4-or 2,6-tolylene, or mixtures thereof, 4,4'-toluidine, and 1,4-xylylene diisocyanates; the nuclear-substituted aromatic compounds, such as dianisidine diisocyanate, 4,4'-diphenylether diisocyanate and chlorodiphenylene diisocyanate; the triisocyanates such as triphenyl methane,-4,4',4"-triisocyanate, 1,3,5-triisocyanate benzene and 2,4,6-triisocyanate toluene; and the tetra-isocyanates such as 4,4'-diphenyl-dimethyl methane-2,2',5,5'-tetraisocyanate; the polymerized polyisocyanates such as tolylene diisocyanate dimers and trimers, and the like.

Blocked isocyanates useful as a crosslinking agent are derived from any of the many organic isocyanates available. Examples include p-phenylene diisocyanate; biphenyl diisocyanate; toluene diisocyanate; 3,3'-dimethyl-4,4'-biphenylene diisocyanate; 1,4-tetramethylene diisocyanate; hexamethylene diisocyanate; 2,2,4-trimethylhexane-1,6-diisocyanate; methylene bis-(phenylisocyanate); isophorone diisocyanate; 1,2,4-benzene triisocyanate; polymethylene polyphenyl isocyanate; bis(isocyanatocyclohexyl)methane; and methyl cyclohexyl diisocyanate, as well as derivatives thereof. Typical blocking agents are phenols, thiols, oximes, caprolactams, and secondary aromatic amines. Many of these compounds are commercially available. "The Chemistry of Organic Film Formers", Robert E. Krieger Pub. Co., copyrighted 1977, by D. H. Solomon, pp. 216–217, contains a description of many blocked isocyanates that can be used here. The disclosure of this publication is herein incorporated by reference.

Phenoplast resins include the condensation product of an aldehyde with a phenol. Formaldehyde is a preferred aldehyde. Various phenols can be used, e.g., phenol per se, cresol, para-phenylphenol, para-tertiaryphenol, para-tetriaryamylphenol and cyclopentylphenol. The methylol phenol ethers described in U.S. Pat. No. 2,597,330 (herein incorporated by reference) are especially useful.

The ratio of the polyol to the crosslinking agent ranges from about 20:80 to about 80:20, preferably from about 35:65 to about 65:35.

There are also polyol-containing acrylics which are useful as the film-forming component. Of these, one type must be externally combined with crosslinking agents such as the above described aminoplast resins, phenoplast resins, isocyanate resins, or blocked isocyanates, while one type already contains a crosslinking agent internally.

In a preferred embodiment of this aspect of the invention, termosetting acrylic resins comprising the hydroxyalkyl esters of ethylenically-unsaturated carboxylic acids and at least one other ethylenically unsaturated monomer copolymerizable therewith, such as are described in U.S. Pat. Nos. 2,681,897 and 3,084,184 is used. The resin is curable by the addition of the above described aminoplast, phenoplast, isocyanate, or blocked isocyanate resins.

Preferred interpolymers of the class described are those containing hydroxyalkyl esters in which the alkyl group has up to about 18 carbon atoms. Especially preferred esters are acrylic acid and methacrylic acid esters of ethylene glycol and 1,2-propylene glycol, i.e., hydroxyethyl acrylate and methacrylate, and hydroxypropyl acrylate and methacrylate. However, there may also be employed similar esters of other unsaturated acids, for example, ethacrylic acid, crotonic acid, and similar acids having up to about 6 carbon atoms, as well as esters containing other hydroxyalkyl radicals, such as hydroxybutyl esters and hydroxylauryl esters.

In addition to esters of unsaturated monocarboxylic acids, there may be employed the mono- or diesters of unsaturated dicarboxylic acids, such as maleic acid, fumaric acid and itaconic acid, in which at least one of the esterifying groups is hydroxyalkyl. Such esters include bis(hydroxyalkyl) esters, as well as various other alkylene glycol esters of such acids and mixed alkyl hydroxyalkyl esters, such as butyl hydroxyethyl maleate and benzyl hydroxypropyl maleate. The corresponding monoesters, such as the mono(hydroxyethyl), mono(hydroxypropyl), and similar alkylene glycol monoesters of maleic acid and similar acids, can also be used, and for some purposes are preferred.

The monomer or monomers with which the hydroxyalkyl ester is interpolymerized can be any ethylenic compound copolymerizable with the ester, the polymerization taking place through the ethylenically unsaturated linkages. These include monoolefinic and, in minor amounts, polyolefinic hydrocarbons, halogenated monoolefinic and diolefinic hydrocarbons, unsaturated esters of organic and inorganic acids, esters or amides of unsaturated acids, nitriles, unsaturated acids, and the like. Examples of such monomers include styrene; butadiene-1,3;2-chlorobutene; acrylonitrile; alphamethyl styrene; alphachlorostyrene; 2-chlorobutadiene-1:3, 1,1-dichloroethylene; vinyl butyrate; vinyl acetate; vinyl chloride; allyl chloride; dimethyl maleate; divinyl benzene; diallyl itaconate; triallyl cyanurate; and the like. The preferred monomers are acrylates and methacrylates, such as ethyl acrylate, propyl acrylate, ethylhexyl acrylate, acrylamide, methyl methacrylate, butyl methacrylate, and the like, as well as methacrylic and acrylic acid. These resins are combined with the aminoplast, phenoplast or isocyanate resins and are cured upon heating.

Another important class of thermosetting acrylic resins that are used comprises the crosslinking carboxyl-containing polymers. The thermosetting carboxyl polymers that are used herein consist generally of acrylic resins or modified acrylic resins containing from about 3 to about 40 percent by weight of ethylenically unsaturated acid. These interpolymers are curable when combined with a compound containing functional groups such as the above described aminoplast, phenoplast, isocyanate or blocked isocyanate resins.

Acrylic materials which may be used include acrylates, such as ethyl acrylate, butyl acrylate, and hexyl acrylate; methacrylates, such as methyl methacrylate, isopropyl methacrylate, acrylonitrile, and hexyl methacrylate; maleate esters, such as dibutyl maleate; and fumarates, such as ethyl fumarate.

The ethylenically unsaturated acids which may be used are those such as acrylic acid, methacrylic acid, fumaric acid, maleic acid, and itaconic acid.

The second type of polyol-containing acrylics comprises interpolymers of an unsaturated carboxylic acid amide with at least one other monomer having a $CH_2=C<$ group, said interpolymers being characterized by having amido hydrogen atoms replaced by the structure $-RCHOR_1$, wherein R is selected from the group consisting of hydrogen and saturated lower aliphatic hydrocarbon radicals and $R_1$ is a member of the class consisting of hydrogen and lower alkyl radicals. In general, these interpolymers can be produced in two ways. In the first method, the unsaturated carboxylic acid amide chosen is an N-alkoxymethyl acrylamide (i.e., a material having an $-NHRCHOR_1$ group in the molecule). This N-alkoxymethyl acrylamide is then polymerized with at least one other monomer having a $CH_2=C<$ group to produce a useful interpolymer. In the second method, an unsaturated carboxylic acid amide e.g., acrylamide is polymerized with at least one other monomer having a $CH_2=C<$ group and is then reacted with an aldehyde to form a useful interpolymer.

Examples of the interpolymers usable and their methods of manufacture are disclosed in U.S. Pat. Nos. 2,870,117, 2,978,434, 3,035,965 and 3,079,434. These interpolymers contain hydroxyl groups.

The interpolymers of unsaturated carboxylic acid amides (as defined above) are the preferred thermosetting acrylic resins to be used in this invention. This acrylic resin type is curable in and of itself and need not be combined with a crosslinking agent. If desired, however, crosslinking agents can be added.

Among the monomers which may be polymerized with the unsaturated carboxylic acid amides are acrylates such as methyl acrylate, ethyl acrylate, isobutyl acrylate, and hexyl acrylate; styrene, vinyl toluene, maleate esters, such as dibutyl maleate; acidic materials such as acrylic acid, methacrylic acid, and maleic anhydride; vinyl ethers; vinyl ketones; vinyl pyridines, allyl acetoacetates; glycidyl acrylates; methacrylamide; dimethylbenzyl methacrylate; hydroxy-substituted acrylics, such as hydroxyethyl acrylate; and the adducts of epsilon-caprolactone and hydroxyalkyl acrylates. In general, a preferred group of monomers includes ethyl acrylate, butyl acrylate, methyl acrylate, styrene, vinyl toluene, acrylonitrile, acrylic acid, monomethyl styrene and hydroxyethyl acrylate.

It has been found that preferred unsaturated carboxylic acid amide interpolymers are obtained when at least two monomeric compounds are interpolymerized with the N-alkoxymethylacrylamide-containing or the amide-containing material. In this manner, it is possible to tailor the interpolymer to have any desired degree of hardness or flexibility. For example, one useful ternary interpolymer is prepared from the acrylamide, hydroxyethyl acrylate and methyl methacrylate, this interpolymer then being reacted with an aldehyde to produce a material useful in this invention.

It is known that small amounts of methyl methacrylate tend to improve the hardness of multi-component interpolymers where one of the monomers is of the type which forms soft homopolymers. It has also been found that a small quantity of an acid monomer, such as acrylic acid, methacrylic acid, crotonic acid, maleic acid or fumaric acid, is particularly useful as an internal catalyst in that it imparts to the coating composition desirable fast curing properties. In place of acrylamide, any other polymerizable amide, for example, methacrylamide or itaconic diamide, may be utilized.

The N-alkoxymethyl acrylamides useful in this invention are known in the art, and include such materials as N-alkoxymethyl acrylamides, N-alkoxymethyl methacrylamides, alkoxymethyldiacetone acrylamides, O-(acryloxyethyl)-N-(alkoxymethyl)carbamates, N-methyl-N-alkoxymethylacrylamides, and the like. Specific examples include N-butoxymethylacrylamide, N-isobutoxymethylacrylamide, N-(methoxyethoxymethyl)acrylamide, methoxymethyldiacetoneacrylamide, O-(methacryloxyethyl)N-methoxymethyl carbamate and hydroxylmethylacrylamide.

These resins are cured in the presence or absence of added aminoplast resin or phenolic resin. In general, the internal curing agent comprises from about one to about 25 percent by weight of the acrylic interpolymer.

The above described curable film-forming resins are, in general, solvent soluble. For the resins to be water-soluble or -dispersible, it is necessary to introduce salt groups into the resins. This method of making resins water-soluble or dispersible is well known in the art.

Reactive diluents useful in the compositions described above have one primary or secondary hydroxyl group and are selected from the group consisting of ethers having less than 5 ether groups, amides, esters, urethanes, ureas, sulfur-containing compounds and mixtures thereof. The diluents are further characterized by having a retained solids value of greater than about 80 percent, preferably greater than about 85 percent, a hydroxyl equivalent weight of from about 180 to about 800, preferably from about 200 to about 500, and a liquid viscosity of less than about 10 poise, preferably less than about 5 poise, at 60° C. The retained solids value is a measure of the reactive diluent's ability to be cured into the coating prior to being volatilized. For purposes of this test, 1 gram of a mixture of (a) 0.1 hydroxyl gram equivalent weight of the reactive diluent, (b) 16 grams of hexakis (methoxymethyl) melamine (HKMMM) and (c) 1 weight percent p-toluenesulfonic acid (PTSA) is baked in an aluminum weighing dish and cured at 150° C. for 30 minutes. The retained solids value is then determined using the following equation:

$$\text{Retained solids (\%)} = \frac{\text{cured film weight (grams)} - 0.75 \times \text{HKMMM (grams)} - \text{PTSA (grams)}}{\text{reactive diluent in the sample before bake (grams)}} \times 100$$

The liquid viscosity of the reactive diluents is measured at 60° C. Some of the reactive diluents of this invention are liquid at 60° C., however, others are solids at 60° C. Viscosities of the later reactive diluents are measured by heating the diluent to a temperature sufficient to liquefy it, cooling it to 60° C. and then measuring its viscosity while still in a liquid or supercooled state.

The above physical characteristics are necessary in order to get the performance desired in this invention. Thus, the high retained solids value of the diluent is needed so as to allow the diluent to react into the curable film forming component of the composition prior to evaporating into the atmosphere. In a similar manner, the hydroxyl functionality is needed for the diluent to be reacted into the film. The other functional groups in the reactive diluent are needed for solution compatibility and contributing to low volatility. Moreover, the diluents must have a liquid viscosity of less than about 10 poise at 60° C. so as to result in a coating composition with a reduced viscosity, yet not a lower solids content. Thus, the diluent can be a solid at room temperature; however, during application, it must be capable of liquefying and acting as a diluent for the remaining components of the composition.

Classes of the reactive diluents which are useful are found in the following paragraphs. Of the following classes, the ester-containing reactive diluents are preferred, with the ester-containing reactive diluents further having allyl side chains being most preferred.

I.

One class of reactive diluents which meets the above-stated criteria is produced by the reaction of an alcohol with a monoepoxide to produce an ether compound. Many different alcohols can be used. Suitable alcohols include aliphatic, arylaliphatic, alicyclic and heterocyclic alcohols. Saturated as well as unsaturated alcohols are used. The alcohol contains from 1 to 11, preferably 4 to 8, carbon atoms and is saturated. Examples of suitable alcohols include lower aliphatic alcohols, such as methyl alcohol, ethyl alcohol, propyl alcohol, isopropyl alcohol, butyl alcohol, amyl alcohol, hexyl alcohol, octyl alcohol, nonyl alcohol, 3,3,5-trimethyl hexanol, decyl alcohol, allyl alcohol, crotyl alcohol, 2-hydroxyethyl acrylate, 2-hydroxyethyl methacrylate, hydroxypropyl acetate and methylvinylcarbinol; arylaliphatic alcohols such as benzyl alcohol, phenylethyl alcohol and cinnamyl alcohol; alicyclic alcohols such as cyclohexanol, and cyclopentanol; heterocyclic alcohols such as N-betahydroxyethyl morpholine, N-beta-hydroxypropyl piperidine and furfuryl alcohol; and ester-containing alcohols such as obtained by the reacton of butyl alcohol and caprolactone.

The monoepoxides used in the reaction with the alcohol are selected from those having the structural formula

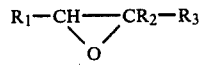

where $R_1$ and $R_2$ are hydrogen, lower alkyl groups of 1 to 18 carbon atoms or are joined together to form a $C_4$ to $C_{10}$ member ring, $R_3$ is an alkyl or aryl group containing from 1 to 18 carbon atoms, $CH_2-O-R_4$ or

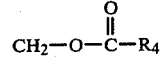

where $R_4$ is an alkyl, alkenyl, or aryl group having from 1 to 18 carbon atoms, provided the sum of the carbon atoms in $R_1$, $R_2$ and $R_3$ is at least 2. Examples of suitable monoepoxides are alkylene oxides containing from 4 to 8 carbon atoms, including 1,2-butylene oxide and 1,2-pentene oxide. Other suitable epoxides include styrene oxide, cyclohexene epoxide, butadiene epoxide, the glycidyl esters of monobasic acids such as glycidyl acrylate, glycidyl methacrylate, glycidyl acetate, glycidyl butyrate, glycidyl palmitate, and glycidyl laurate. Still other suitable monoepoxides include the glycidyl ethers of alcohols and phenols such as butyl glycidyl ether, octyl glycidyl ether, allyl glycidyl ether, phenyl glycidyl ether and para-(tertiary butyl) phenyl glycidyl ether. The ethers have less than 5 ether groups. It has been found ethers having 5 or more ether groups are not desired because such materials are too viscous and/or too hydrophilic.

II.

Amides are another class of reactive diluents. One class of amides is produced by the reaction of a monoamine with a lactone. The amines include the aliphatic, arylaliphatic, alicyclic, aromatic, and heterocyclic amines. The aliphatic amines are characterized by the structural formula $$RNH_2 \text{ or } (R_2)NH$$

wherein R is an aliphatic group containing from 1 to 18 carbon atoms, preferably 1 to 10 carbon atoms. Such amines include methylamine, ethylamine, propylamine, dimethylamine, diethylamine, methylethylamine, and butylamine. Examples of suitable arylaliphatic amines include benzyl amine, phenylethyl amine and 2-phenylpropylamine. Alicyclic amines include cyclohexyl amine, N-methyl cyclohexyl amine and dicyclohexyl amine. Examples of suitable aromatic amines include aniline, N-methylaniline, o-toluidine, p-bromoaniline, 2,4-dimethylaniline and p-phenoxyaniline. The heterocyclic amines include piperidine, morpholine, 2-(2-aminoethyl) pyridine, 4-aminopyridine, and N-(2-aminoethyl) morpholine.

The above-described monoamines are reacted with a lactone to produce the desired reactive diluent. The lactone is represented by the general formula $$\begin{array}{c} (CR_2)_n - C = O \\ | \qquad\quad | \\ O \rule{1cm}{0.4pt} \end{array}$$

wherein n is an integer of from 2 to 9, wherein the R's are selected from the group consisting of hydrogen, alkyl, cycloalkyl, alkoxy and single ring aromatic hydrocarbon radicals. The preferred lactones are the epsiloncaprolactones where n equals 5. Most preferred is an unsubstituted epsiloncaprolactone where n is equal to 5 and all of the R's are hydrogen.

Another amide reactive diluent is produced by the reaction of an alkanolamine with a monocarboxylic acid or its ester. The alkanolamines preferably have from about 2 to about 10 carbon atoms. Examples of suitable alkanol amines include ethanolamine, aminopropyl alcohol, 2-amino-2-methyl-1-propanol, 3-aminocyclohexyl alcohol, and para-aminobenzyl alcohol.

The monocarboxylic acids contain from about 1 to about 18 carbon atoms, preferably 1 to 10 carbon atoms. Examples of such materials include saturated monocarboxylic acids, such as formic acid, acetic acid, propionic acid, butyric acid, isobutyric acid, valeric acid, caproic acid, isocaproic acid, caprylic acid, lauric acid, myristic acid, palmitic acid and stearic acid. Examples of unsaturated monocarboxylic acids include oleic acid, linoleic acid, and sorbic acid. The monocarboxylates include esters of the aforedescribed carboxylic acids. The hydroxyl-containing amides are produced by the reaction of a monoaminoalcohol with the aforedescribed carboxylic acids.

Still other amide reactive diluents include those obtained by the reaction of a monoamine with a dicarboxylic anhydride, followed by the reaction with a monoepoxide. The monoamine starting reactant is as described above. Examples of suitable dicarboxylic anhydrides which can be used are succinic anhydride, maleic anhydride, phthalic anhydride and hexahydrophthalic anhydride. The resultant reaction product is next reacted with a monoepoxide. The monoepoxides described above can be used in this step of the reaction.

Still another class of amide reactive diluents include those obtained by the reaction of an alkanolamine with a dicarboxylic anhydride. The aforedescribed alkanol amines and dicarboxylic acid anhydrides are used in this reaction step.

III.

Ester-containing reactive diluents are produced by a number of different routes. One preferred route includes the reaction of a monoalcohol with a dicarboxylic anhydride, followed by the reaction with a monoepoxide. Suitable monoalcohols include those listed above in Class I. Preferred monoalcohols contain from about 1 to about 10 carbon atoms. The dicarboxylic anhydrides described above can also be used in this reaction step. Preferred are those anhydrides containing from about 4 to about 10 carbon atoms. The monoepoxides include those listed above as well as those monoepoxides having 2 to 10 carbon atoms such as ethylene oxide, propylene oxide and butyl glycidyl ether.

Another class of esters are produced by the reaction of an alcohol with a lactone. Suitable alcohols are those described above with respect to the class I reactive diluents while suitable lactones are those described in the Class II reactive diluents.

A third group of ester reactive diluents are produced by the reaction of a monoalcohol (as described above), a dicarboxylic anhydride (as described above) and a diol. Several diols can satisfactorily be employed. Preferred are the alkylene glycols such as ethylene glycol, propylene glycol, butylene glycol, hexylene glycol and neopentyl glycol. Other diols include cyclohexanedimethanol, caprolactone diol, and polyether glycols, such as poly(oxytetramethylene) glycol. An alternative way of making this diluent is by reacting a diol or an epoxide and a monocarboxylic acid. Another alternative is to react a triol with two equivalents of monocarboxylic acids. Preferred triols are glycerine, trimethylolpropane, trimethylolethane, and 1,2,6-hexanetriol.

IV.

Reactive diluents which fit within the urethane class can also be used. One suitable type of urethane reactive diluent is produced by the reaction of a monoamine with a cyclic carbonate. The monoamines described above can be used here as well. Preferred monoamines contain from about 1 to about 10 carbon atoms. The cyclic carbonates contain from about 3 to about 6 carbon atoms. Examples of such carbonates include ethylene carbonate and propylene carbonate. Another urethane reactive diluent is made by reacting an alkanolamine (as described above) with a non-cyclic carbonate, e.g., diphenyl carbonate to yield hydroxyl-terminated urethanes.

Another urethane type reactive diluent is obtained by the reaction of a (1) monoisocyanate or urea derivative of structure $$\begin{array}{c} \quad\;\; O \;\; H \\ \quad\;\; \| \;\;\; | \\ R_2N - C - NR \end{array}$$

with a (2) diol. The monoisocyanates have the structure

where R contains from about 1 to about 18 carbon atoms. Examples of such monoisocyanates include cyclohexyl isocyanate, methyl isocyanate, ethyl isocyanate, propyl isocyanate, butyl isocyanate and toluene isocyanate. The diols used in this reaction are the same as the diols described above with respect to the ester-containing reactive diluents.

V.

Still another class of reactive diluents include the urea-type diluents. Such materials are made by the reaction of a monoisocyanate with an alkanolamine. Monoisocyanates as described immediately above are used herein. The alkanolamines are described above with respect to the amide-type compounds.

VI.

Sulfur-containing reactive diluents are derived from the reaction of (a) a thiol with a monoepoxide, dicarboxylic anhydride or lactone, (b) a thiol containing a hydroxyl group with a monoisocyanate, (c) a compound of formula RNCS with an alkanolamine or (d) a thiol containing a hydroxyl group with a non-cyclic carbonate.

Examples of sulfur-containing diluents are made from thiols such as ethanethiol, propanethiol, butanethiol, hexanethiol, 2-propene-1-thiol, alpha-toluenethiol, cyclohexanethiol and thiophenol. Thiols containing one hydroxyl group include 2-mercaptoethanol and 2-mercaptopropanol. Compounds of formula RNCS are exemplified by phenylisothiocyanate, butylisothiocyanate, cyclohexylisothiocyanate and benzylisothiocyanate.

The compounds reacted with the sulfur-containing compounds, i.e., the monoepoxides, dicarboxylic anhydrides, lactones, monoisocyanates and alkanolamines are those described in the immediately preceding paragraphs.

The vehicle portion of the coating compositions consists essentially of from about 60 percent to about 97 percent of the curable film forming component and from about 3 percent to about 40 percent of the organic reactive diluent. The vehicle portion of the preferred coating compositions consists essentially of from about 70 percent to about 97 percent of the film forming component and from about 3 percent to about 30 percent of the organic reactive diluent, while the respective percentages of most preferred compositions are about 75 percent to about 95 percent and about 5 percent to about 25 percent. Other conventional additives can be included in the coating compositions. Thus, conventional organic solvents and water can be used. A further characterizing feature of preferred compositions is that they are sprayable when containing less than about 40 percent volatile organic solvent water or a mixture thereof. However, it is preferred that the compositions contain less than about 40 percent, more preferably less than about 20 percent, of the volatile organic solvent and/or water. Other conventional additives, such as surfactants, pigments, dyes, antioxidants, etc., are included in the compositions for their known functions.

Compositions of this invention have a prolonged shelf stability when properly formulated. However, when a crosslinking agent is used which is reactive at room temperature with the remaining components of the composition, the compositions should be used shortly after mixing. Such compositions can be packaged as two package compositions. One part of the package consists essentially of the organic polyol and the reactive diluent and the second part of the package consists essentially of the crosslinking agent.

The coating compositions are applied by any convenient method, including spraying, dipping and flow coating. The compositions have been found especially useful for the coating of substrates such as wood, metal, wallboard and various ceramics.

The following examples are illustrative of the described invention. The reactive diluents of Examples I and III represent preferred embodiments of the disclosed diluents for use in coating compositions of this invention.

EXAMPLE I

A 22-liter flask is equipped with stirrer, condenser, thermometer, nitrogen blanket and addition funnel. Initially, 5,076 grams of benzyl alcohol and 6,956 grams of phthalic anhydride are charged to the flask. With the stirrer on, the mixture is heated to 119° C. over a time period of about 3 hours until an acid value of 216.6 is obtained. At this point, 17.9 grams of diisobutylcresoxyethoxyethyl dimethyl benzyl ammonium chloride monohydrate (available from Rohm and Haas Co. as Hyamine 10-X) and 1.8 grams of methyl quinone are added. Allyl glycidyl ether is next added in increments over a time period of about 7½ hours. The total amount added is 5,517.8 grams. The acid value of the mixture 1½ hours after the final add is 39.0 441.8 grams of propylene oxide are now added. The addition is made over a 1 hour time period. At the end of the 1 hour, the mixture has an acid value of 31.0. A temperature of about 103° C. to about 116° C. is maintained throughout the above additions of the allyl glycidyl ether and propylene oxide. After the final addition of the propylene oxide, the mixture is held at a temperature of about 117° C. for about 2½ hours.

The final reaction mixture has a solids content at 105° C. of 90.4 percent, a liquid viscosity of 0.8 poises at 60° C., a retained solids value of 94.2 percent, a hydroxyl equivalent weight of 364, an acid number of 21.3, a hydroxyl number of 154 and an epoxy equivalent of 5,006.

The ability of the above material to act as a reactive diluent is tested by formulating compositions containing varying levels of the reactive diluent and measuring their viscosities.

| Compositions (%) | A | B | C | D | E |
|---|---|---|---|---|---|
| Polyester polyol (1) | 25.8 | 23.8 | 21.6 | 19.6 | 17.4 |
| Aminoplast resin (2) | 14.6 | 14.1 | 13.8 | 13.2 | 12.8 |
| Epoxy resin (3) | 3.3 | 3.3 | 3.3 | 3.3 | 3.3 |
| Reactive diluent | 0 | 2.2 | 4.5 | 6.8 | 9.1 |
| Pigment (4) | 37.7 | 37.7 | 37.7 | 37.7 | 37.7 |
| Butyl alcohol | 1.7 | 1.7 | 1.7 | 1.7 | 1.7 |
| Ethyl alcohol | 2.1 | 2.1 | 2.1 | 2.1 | 2.1 |
| Xylene | 4.2 | 4.5 | 4.7 | 5.0 | 5.3 |
| Surfactant (5) | 0.1 | 0.1 | 0.1 | 0.1 | 0.1 |
| Acid catalyst (6) | 1.3 | 1.3 | 1.3 | 1.3 | 1.3 |

-continued

| Compositions (%) | A | B | C | D | E |
|---|---|---|---|---|---|
| Microgel dispersion (7) | 9.2 | 9.2 | 9.2 | 9.2 | 9.2 |

(1) Derived from the reaction of 2.6 moles of neopentyl glycol, 0.35 mole of trimethyolpropane, 1 mole of isophthalic acid and 1 mole of dimethylcyclohexanedicarboxylate.
(2) A melamine-formaldehyde condensation product available from American Cyanamid Co. as Cymel 303.
(3) Available from Shell Chem. Co. as EPON 1001.
(4) Titanium dioxide available from E. I. du Pont de Nemours as R-900.
(5) A silicone surfactant available from Dow Chemical Co. as L-75 Silicone.
(6) An adduct of a glycidyl ester of a saturated tertiary monocarboxylic acid of $C_{9-11}$ chain lengths and p-toluene sulfonic acid, 3:1 and 63% solids in methyl isobutyl ketone.
(7) Corresponding to the dispersion described in Example II of U.S. Pat. No. 4147688.

Characteristics of the compositions are summarized in the following table. The viscosities are measured in seconds with a #3 Zahn cup. The atomization grades are related to the viscosity of the respective compositions and is a measure of compositions' ease of application.

| Composition | % Reactive Diluent | % Solids | Viscosity | Atomization |
|---|---|---|---|---|
| A | 0 | 79.1 | 23 | poor |
| B | 2.2 | 79.0 | 21 | fair |
| C | 4.5 | 78.9 | 20 | fair |
| D | 6.8 | 78.9 | 19 | good |
| E | 9.1 | 78.9 | 17 | excellent |

The above results show that compositions having essentially the same theoretical solids contents become less viscous with increasing amounts of reactive diluent. Moreover, the 23 second viscosity of Composition A is unacceptable for production, whereas the viscosities of Compositions B-E are sufficiently low to allow for production application.

Compositions A-E are sprayed onto iron phosphate pretreated steel panels, baked 20 minutes at 175° C. and tested for various characteristics to determine the effect of the inclusion of the reactive diluent in the compositions. The results are as follows:

| Composition | A | B | C | D | E |
|---|---|---|---|---|---|
| Film thickness (mils) | 2.2 | 2.3 | 2.2 | 2.1 | 1.9 |
| Cross-hatch adhesion loss | 0% | 5% | 0% | 0% | 0% |
| Pencil hardness | 4H | 4H | 4H | 4H | 4H |
| Impact resistance (in lbs.) | | | | | |
| forward | 50 | 60 | 40 | 60 | 60 |
| reverse | 10 | 10 | 10 | <10 | 10 |
| Acetone double rubs | >100+ | >100+ | >100 | >100 | >100 |
| Gloss | | | | | |
| 60° | 75 | 77 | 68 | 72 | 70 |
| 20° | 37 | 41 | 30 | 33 | 30 |
| Conical mandrel ⅛" (% cracking) | 2% | 3% | 2% | 2% | 1% |

The results of all these tests indicate the film properties of the compositions are not adversely affected by increasing levels of the reactive diluent.

EXAMPLE II

Another reactive diluent is made in a manner similar to the reactive diluent of Example I. A 3-liter flask is equipped with reflux condenser, stirrer, thermometer, air blanket and addition funnel. Initially, 525.0 grams of hydroxyethyl methacrylate, 627.0 grams of phthalic anhydride and 0.1 grams of hydroquinone are added and heated to 100° C. 1.8 grams of Hyamine 10-X is next added. At this point, 668.3 grams of phenyl glycidyl ether is added over 20 minutes and the temperature is maintained at 100° C. for about 8 hours. An additional 0.09 grams of hydroquinone is added and the mixture is held at 100° C. until an acid value of 40.7 is obtained.

The reaction mixture is analyzed and found to contain 88.3 percent solids, a liquid viscosity of 4.0 poises at 60° C., a retained solids value of 93.4 percent, a hydroxyl equivalent weight of 425, a hydroxyl value of 132 and an epoxy equivalent of 7783. A coating composition containing the reactive diluent is illustrated in Example IV.

EXAMPLE III

A 1-liter flask is set up with stirrer, condenser, thermometer, nitrogen blanket and an addition funnel. The flask is charged with 296.0 grams of phthalic anhydride and 428.0 grams of trimethylolpropane diallyl ether. The mixture is heated at 108° C. until an acid number of 157 is obtained. At this point, 150.0 grams of propylene oxide is added over about 4 hours. The acid value after the addition of the propylene oxide is 76.1. The reaction mixture is maintained at about 113° C. for about 4 hours. The acid value of the mixture at this point is 40.6. It was then heated at 70°-82° C. for 15 minutes at 10 mm mercury to remove unreacted epoxides.

The mixture is analyzed and found to contain 93.7 percent solids, a liquid viscosity of 2.8 poises at 60° C., a retained solids value of 96.0 percent, a hydroxyl equivalent weight of 321, an acid number of 48.8, a hydroxyl number of 125.7 and no detectable epoxy equivalent. Example IV illustrates a coating composition containing this reactive diluent.

EXAMPLE IV

A pigment paste contains the following:

| | % |
|---|---|
| Polyester polyol (1) | 16.7 |
| Aminoplast resin (2) | 6.6 |
| Ethylene glycol monoethyl ether acetate | 2.6 |
| Pigment | 59.5 |
| Microgel dispersion (1) | 14.6 |

(1) As used in Example I.
(2) An etherified melamine-formaldehyde condensate available from American Cyanamid Co. as Cymel 303.

Next coating compositions are formulated as follows:

| Compositions (%) | A | B |
|---|---|---|
| Pigment paste | 62.0 | 62.3 |
| Polyester polyol (4) | 4.0 | 4.0 |
| Aminoplast resin (4) | 10.3 | 10.4 |
| Epoxy resin (4) | 3.2 | 3.2 |
| Surfactant (4) | 0.1 | 0.1 |
| Reactive diluent of Ex. II | 9.0 | — |
| Reactive diluent of Ex. III | — | 8.5 |
| Acid catalyst (4) | 1.3 | 1.3 |
| Diacetone alcohol | 0.2 | 0.2 |
| Xylene | 9.9 | 10.0 |

(4) As in Example I.

A series of tests are used to demonstrate the properties of films formed from the compositions. The compositions are coated onto an iron phosphate pretreated steel substrate and baked at 135° C. for 28 minutes.

|  | Composition A | Composition B |
|---|---|---|
| Salt spray test | | |
| Blistering | Slight | None |
| Adhesion loss (%) | <1% | <1% |
| Scribe (width in mm) | 4 | 7 |
| Duration (hrs.) | 270 | 270 |
| Pencil hardness | H | H |
| Conical mandrel, ⅛", (% cracking) | 2 | 0 |
| Cross-hatch adhesion (% loss) | 0% | 5% |

EXAMPLE V

A 5 liter reaction flask is set up as in Example I. The flask is initially charged with 1,110 grams of butyl alcohol and 2,250 grams of phenyl glycidyl ether and heated to 40° C. Next 4 cc of boron trifluoride etherate is added over a 35 minute time period. The reaction mixture exotherms to 134° C. The mixture is cooled to 69° C. and then held at 70°-80° C. for about 2 hours. Five hundred (500) cc of a 3:1 solvent blend of cyclohexane and toluene are added and the mixture heated. After 3½ hours at 110° C., 430 cc of the solvent is stripped out.

The resultant product contains 66.3 percent solids, has a retained solids value of 84.8 percent, a liquid viscosity of 0.9 poises at 60° C. and a hydroxyl equivalent weight of 227.

EXAMPLE VI

An amide reactive diluent is prepared by charging epsiloncaprolactone (2,394 grams, 1.05 moles) and morpholine (1,460 grams, 1.0 moles) to a 5 liter reaction vessel. With a nitrogen sparge, the mixture is heated to 140° C. and maintained at that temperature over an 8½ hour time period. An IR spectrum shows no caprolactone present. The mixture is then heated to 170° C. until an amine equivalent value of 6277 is obtained.

The reaction product has a retained solids value of 96.4 percent, a liquid viscosity at 60° C. of 1.5 poises and a hydroxyl equivalent weight of 549.

EXAMPLE VII

A 22 liter reaction vessel is equipped as in Example I and is initially charged with 8,308 grams of morpholine and 9,690 grams of propylene carbonate. The mixture is first heated to 120° C. and then held at 100° C. for 22½ hours. The mixture has an amine equivalent value of 3,252. Again the mixture is allowed to cool. Now 1,999 grams of propylene carbonate is added. The mixture is once again heated to 110° C. and held there for 8 hours. At this point, the mixture has an amine equivalent value of 6,944.

The diluent has a retained solids value of 77.1 percent, a liquid viscosity at 60° C. of 0.3 poises, a hydroxyl equivalent weight of 227 and a hydroxyl value of 247.

EXAMPLE VIII

A urea reactive diluent is made by first charging a 1 liter reaction vessel equipped as in Example I with 90.2 grams (0.80 moles) 2-amino-2-methyl-1-propanol solution (80% solids in water). Next, 99.8 cc (1.01 moles) of butyl isocyanate is gradually added over a 1½ hour time period. Cooling is used to maintain the temperature of the mixture at 25°-38° C. A sample checked by IR shows no NCO present.

The mixture has an 86.0 percent solids content. The diluent has a retained solids value of 80.0 percent, a 60° C. liquid viscosity of 2.5 poises, a hydroxyl equivalent weight of 187 and a hydroxyl number of 298.

EXAMPLE IX

In this example, 2-mercaptoethanol and diethylcarbonate are reacted to form a thio reactive diluent. A 2-liter reaction flask is equipped with thermometer, stirrer, nitrogen blanket, addition funnel, and a packed column for distillation. It is charged with 380 grams (5.0 moles) of the 2-mercaptoethanol and 590 grams (5.0 moles) of the diethylcarbonate. A nitrogen blanket is maintained while the mixture is first heated to 60° C. About 4.9 grams of cyclohexyldimethylamine is added and the mixture heated to 130° C. At this point about 4.8 grams of additional cyclohexyldimethylamine is added. The 130° C. temperature is maintained for about 5 hours. The temperature is allowed to drop to 60° C., at which time 2 grams of diazabicyclo [2.2.2] octane (available from Air Products Co. as DABCO) is added. The mixture is now heated to 135° C. The mixture is then cooled to 100° C. and 0.5 grams sodium metal added. The temperature is next increased to about 130° C. and held there for about 12 hours while ethyl alcohol distills from the reaction mixture. Diethylcarbonate (175 ml.) which codistills with the ethyl alcohol is added back during this time period. The mixture is finally cooled, subjected to a vacuum of 34-37 Torr at 46°-72° C. for eighty minutes and filtered.

The filtrate is a reactive diluent, has a retained solids value of 82.0 percent, a 60° C. liquid viscosity of 0.6 poises and a hydroxyl equivalent weight of 289 and a hydroxyl value of 194.

EXAMPLE X

A polyester reactive diluent is made by blending 309 grams (2.86 moles) benzyl alcohol, 691 grams (6.05 moles) epsilon-caprolactone and 1 gram stannous octoate in a container. The container is placed in a 120° C. oven overnight. An IR analysis run the next morning indicates no caprolactone is present, thereby indicating complete reaction.

The polyester has a retained solids value of 86.9, a 60° C. liquid viscosity of 0.7 poises, a hydroxyl equivalent weight of 357 and an acid number of 1.2.

EXAMPLE XI

A series of coating compositions are made having the following formulations:

|  | % | | |
|---|---|---|---|
|  | A | B | C |
| Acrylic polyol (1) | 42.2 | 37.4 | 37.4 |
| Aminoplast resin (2) | 33.4 | 29.5 | 29.5 |
| p-Toluenesulfonic acid | 3.3 | 3.0 | 3.0 |
| Butyl acetate | 21.1 | 18.3 | 18.3 |
| Reactive diluent of Example XI | — | 11.8 | — |
| Reactive diluent of Example VI | — | — | 11.8 |

(1) The acrylic polyol is comprised of 61.4% 2-ethylhexyl acrylate, 36.6% hydroxyethyl acrylate and 2.0% acrylic acid.
(2) As used in Example I Compositions A-C all have substantially the same viscosity, i.e. about 28 seconds on a #4 Ford cup. Solids remaining after baking films formed from compositions A-C are 58.8 percent, 65.2 percent and 61.2 percent, respectively.

Drawdowns of each of the compositions on primed aluminum followed by a 20 minute bake at 120° C. gives hard, glossy, clear films.

The above examples all illustrate the compositions of this invention.

What is claimed is:

1. A coating composition capable of liquid application to a substrate, the vehicle portion of the composition consisting essentially of:
   (a) from about 60 percent to about 97 percent of a polyol-containing curable film forming component having a hydroxyl equivalent weight of from about 40 to about 500 and a hydroxyl functionality of at least 2.0, said component being an interpolymer of an unsaturated carboxylic acid amide with at least one other monomer having a

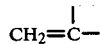

group and characterized in having amido hydrogen atoms replaced by —RCHOR$_1$ wherein R is hydrogen or a saturated lower aliphatic hydrocarbon radical and R$_1$ is hydrogen or a lower alkyl radical; and
   (b) from about 3 percent to about 40 percent of an organic reactive diluent capable of chemically combining with the curable film forming component, said reactive diluent having one primary or secondary hydroxyl group and selected from the group consisting of ethers having less than 5 ether groups, amides, esters, urethanes, ureas, sulfur-containing compounds and mixtures thereof, said amides being selected from the group consisting of a product of the reaction of a monoamine with a lactone, a product of the reaction of an alkanolamine with a monocarboxylic acid or its ester, a product of the reaction of a monoamine with a dicarboxylic anhydride followed by reaction with a monoepoxide, and a product of the reaction of an alkanolamine with a dicarboxylic anhydride, and further characterized by having a retained solids value of greater than about 80 percent, a hydroxyl equivalent weight of from about 180 to about 800 and a liquid viscosity of less than about 10 poises at 60° C.

2. The coating composition of claim 1 containing less than about 40 percent volatile organic solvent.

3. The coating composition of claim 1 containing less than about 40 percent water.

4. The coating composition of claims 1, or 2, wherein the reactive organic diluent is characterized by having a retained solids value of greater than about 85 percent, a hydroxyl equivalent weight of from about 200 to about 500, and a liquid viscosity of less than about 5 poise at 60°.

5. The coating composition of claims 1 or 2 wherein the reactive organic diluent is an ether having less than 5 ether groups.

6. The coating composition of claims 1 or 2 wherein the reactive diluent is an amide.

7. The coating composition of claims 1 or 2 wherein the reactive diluent is an ester.

8. The coating composition of claims 1 or 2 wherein the reactive diluent is a urethane.

9. The coating composition of claims 1 or 2 wherein the reactive diluent is a sulfur-containing compound.

10. The coating composition of claims 1 or 2 wherein the reactive diluent is a urea.

11. The coating composition of claim 5, wherein the reactive diluent is benzyl hydroxyalkyl phthalate.

12. The coating composition of claim 7 wherein the reactive diluent is the reaction product of trimethylolpropane diallyl ether, phthalic anhydride and propylene oxide.

13. The coating composition of claim 5 wherein the reactive diluent is the reaction product of butyl alcohol and phenyl glycidyl ether.

14. The coating composition of claim 7 wherein the reactive diluent is the reaction product of benzyl alcohol, phthalic anhydride and allyl glycidyl ether.

15. The coating composition of claim 7 wherein the reactive diluent is the reaction product of benzyl alcohol and caprolactone.

16. The coating composition of claim 4 wherein the composition consists essentially of from about 70 percent to about 97 percent of the curable film forming component and from about 3 percent to about 30 percent of the reactive organic diluent.

17. The coating composition of claim 1 wherein the composition is further characterized by being sprayable when containing less than about 40 percent volatile organic solvent, water or a mixture thereof.

* * * * *